Patented Mar. 10, 1925.

1,528,905

UNITED STATES PATENT OFFICE.

JOHN C. WOODRUFF, OF LARCHMONT, NEW YORK.

METHOD OF REVIVIFYING SPENT CARBONACEOUS MATERIALS.

No Drawing.   Application filed July 25, 1922.   Serial No. 577,450.

*To all whom it may concern:*

Be it known that I, JOHN C. WOODRUFF, a citizen of the United States, residing at Larchmont, in the county of Westchester, State of New York, have invented certain new and useful Improvements in Methods of Revivifying Spent Carbonaceous Materials; and I do hereby declare the following to be a full, clear, and exact description of the invention, such as will enable others skilled in the art to which it appertains to make and use the same.

This invention relates to the production of activated carbonaceous material such as is adapted for use in decolorizing sugar and like solutions and in purifying oils and other materials, and particularly to the treatment of such activated materials after they have been used for the purposes described and have thus become contaminated with coloring matter or other organic impurities which are separated from the materials treated.

It is customary to subject the "spent" carbonaceous material to a revivifying operation which may involve dry distillation of the material or its subjection to the action of activating gases such as air, carbon dioxide, steam or combustion gases, either alone or in combination. The preferred method of treating such material involves an endothermic oxidation, using steam as an oxidizing agent at a temperature suitable for the maintenance of the water-gas reaction, i. e., 750° to 1100° C. as described in the copending application of John C. Woodruff and Thorne L. Wheeler, Serial No. 294,799. The result of the activating process is to remove the organic impurities by selective oxidation thereof and to restore the active carbonaceous material to approximately its original strength as a decolorizing or like agent.

In revivifying operations as previously conducted, particularly when finely divided decolorizing carbons are employed, it is usual for a loss of about 2 to 3 per cent of the decolorizing agent to result from each cycle of use and revivification. This condition involves a considerable waste and consequent expense, owing to the necessity of periodically replenishing the supply of active carbonaceous material. Also in the present methods of revivifying finely divided decolorizing carbons, especially where dry distillation alone is employed, each regeneration of the material leaves an inactive carbonized residue from the destructive distillation of the absorbed coloring matter. The continued accumulation of this inactive carbonized residue reduces the decolorizing power of the char rapidly. In actual practice the decolorizing power may be reduced as much as 50 per cent in three or four months. This reduction in decolorizing power necessitates the employment of larger amounts of carbon with consequent increased investment in carbon and larger operating and maintenance costs.

It is the object of the present invention to avoid the losses as hereinbefore described and to maintain active carbonaceous material indefinitely at substantially its original decolorizing power.

Further objects and advantages of the invention will be apparent as it is better understood by reference to the following specification in which the preferred embodiments of the invention are described.

I have discovered that the losses in the carbonaceous material resulting from the revivifying operation may be readily avoided by the addition to the spent material of carbonaceous materials, which are not in themselves active i. e., substantially without decolorizing power, before the mass is subjected to the revivifying operation.

Suitable carbonaceous materials are molasses, coal tar pitch, saw-dust, black ash, and numerous other materials are readily available and may be added with advantageous results. By adding organic materials in substantially the quantity necessary to make up the usual losses in the revivifying operation before the spent material is subjected to activation, I am able to produce an active carbonaceous material containing a substantially uniform and unvarying active carbon content. Thus, the material may be used and reused for indefinite periods and the losses incident to the discarding of spent material are entirely avoided.

In carrying out the invention the spent material is preferably mixed with a suitable proportion of carbonaceous material such as those specified and is subjected to an endothermic oxidation preferably in a rotary cylindrical furnace having means therein to insure the distribution of superheated steam throughout the reaction chamber. The distribution of the steam insures the simultaneous contact of fresh steam uncontaminated with the end products of the reaction with all of the carbonaceous material under treatment. The operation is thus rendered more rapid and results in the higher yield of activated material. The chamber in which the reaction is conducted is preferably heated from the exterior to the desired temperature, i. e., 750 to 1100° C. Combustion products mixed with the activating agent may be employed for heating. Any suitable heating means may be employed which is capable of maintaining the desired temperature. The material passes through the chamber in a substantially continuous manner, and when discharged from the end thereof is ready for reuse as active carbonaceous material.

Under some circumstances it may be desirable to subject the spent material, after the addition of carbonaceous material thereto as hereinbefore described, to a dry distillation operation prior to the activation. This dry distillation involves the heating of the material to a temperature in the neighborhood of 450° to 1200° C. without the introduction of an activating agent. It is found that such preliminary treatment facilitates and accelerates the subsequent activation and revivification of the material. It is advantageous, therefore, to pass the material successively through chambers, the first of which is heated to the temperature specified without the addition of activating agents while the second is supplied with superheated steam or other activating agent and maintained at a temperature such as to insure the desired reaction. The material may, of course, be passed successively through the same chamber, being first subjected therein to the dry distillation operation and thereafter to activation in the manner described. It is not essential that the activation immediately follow dry distillation, although obviously there is a saving in the heat required if the material is not permitted to cool between the succesive operations.

The method as herein described has several advantages, among which may be mentioned the prevention of periodical scrapping of large stocks of deteriorated carbon, the restoration of discarded spent material so that it may be employed efficiently as fresh activated carbon, the prevention of continuous loss in decolorizing efficiency by the accumulation of inert carbon in the mass, and the use of smaller amounts of active carbon owing to its higher decolorizing power.

I am aware that the dry distillation of spent decolorizing material has been heretofore suggested. Such treatment does not, however, of itself produce a suitable active material, and as hereinbefore stated, the treatment of carbonaceous material by oxidation for the purpose of activation results eventually in destroying the material. The present invention differentiates from the suggestions heretofore made in requiring the addition of carbonaceous material to the mass prior to activation and the activation of the combined material, thus insuring an active mass of substantially the same quantity and strength as fresh active carbon.

Various changes may be made in the details of the operation within the scope of the accompanying claims without departing from the invention or sacrificing any of the advantages thereof.

I claim:—

1. A process of improving spent carbonaceous material which has been used in decolorizing or purifying liquids, which comprises adding an inactive carbonaceous material directly to the spent carbonaceous material and heating the mass with an activating agent.

2. A process of improving spent carbonaceous material which has been used in decolorizing or purifying liquids, which comprises adding an inactive carbonaceous material directly to the spent carbonaceous material and subjecting the mass to dry distillation and thereafter heating the mass with an activating agent.

3. A process of improving spent carbonaceous material which has been used in decolorizing or purifying liquids, which comprises adding an inactive carbonaceous material directly to the spent carbonaceous material and subjecting the mass to endothermic oxidation.

4. A process of improving spent carbonaceous material which has been used in decolorizing or purifying liquids, which comprises adding an inactive carbonaceous material directly to the spent carbonaceous material and subjecting the mass to dry distillation and thereafter to endothermic oxidation.

In testimony whereof I affix my signature.

JOHN C. WOODRUFF.